E. R. BEHLERS.
VENT.
No. 170,982. Patented Dec. 14, 1875.
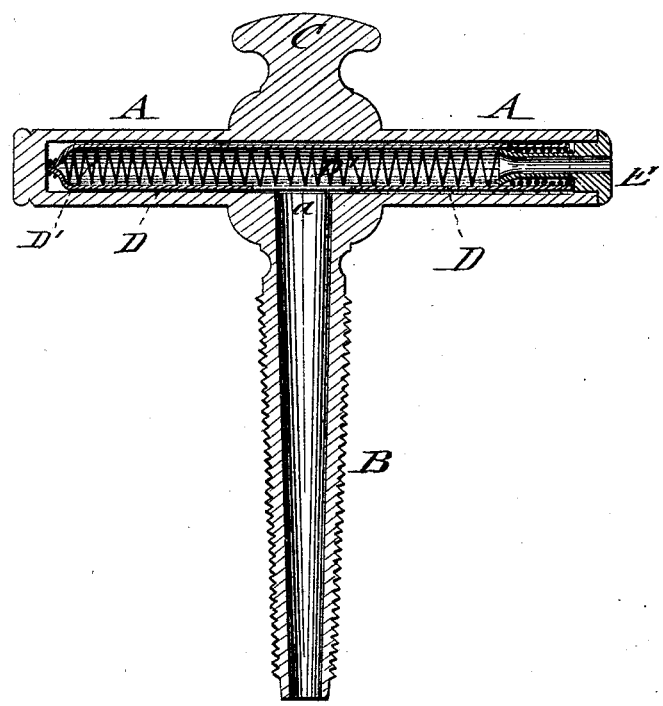
WITNESSES:
Francis McArdle,
Alex F. Roberts
INVENTOR:
E. R. Behlers
BY
[signature]
ATTORNEYS.

UNITED STATES PATENT OFFICE.

EDWARD R. BEHLERS, OF ST. LOUIS, MISSOURI.

IMPROVEMENT IN VENTS.

Specification forming part of Letters Patent No. 170,982, dated December 14, 1875; application filed November 6, 1875.

*To all whom it may concern:*

Be it known that I, EDWARD R. BEHLERS, of St. Louis, in the county of St. Louis and State of Missouri, have invented a new and Improved Vent, of which the following is a specification:

The accompanying drawing represents a vertical longitudinal section of my improved vent for beer and other barrels or kegs.

My invention relates to an improved vent that is closed perfectly air-tight at all times, but supplies air as soon as the faucet is turned.

The invention consists of a rubber tube, which is supported by an interior spiral spring, and fitted, by a perforated closing knob, into a receiving-tube, that communicates by a downward-extending tube driven into the bung or barrel with the interior of the same. A slit in the rubber tube, above the connecting-tube, supplies the air on opening the faucet, closing air-tight on closing the same.

In the drawing, A represents the receiving-tube, which is open at one end, and provided at right angles thereto with a downward-extending tube, B, with external thread, if desired, and a solid knob, C, at the top, both being cast in one piece with the receiving-tube A. An elastic rubber tube, D, is closed at one end, and securely attached at the other to a perforated knob, E, that fits closely on the end of the receiving-tube. The rubber tube is supported throughout its length by a spiral spring, D′, that imparts body to the rubber tube, and allows freely the passage of air from the knob through the same. The supported rubber tube D′ is made to fit exactly into the receiving-tube A, and is inserted into the same, so as to fill it up entirely. By putting in a small quantity of grease on the rubber at the knob, it will be found comparatively easy to insert and withdraw the same at will. The rubber plug D is provided with a longitudinal slit, *a*, that is placed above the opening of the connecting-tube B, when the plug is inserted.

The spiral spring serves to prevent the slit from opening toward the inside, while it admits the ready opening of the slit for admitting the passage of air to the barrel.

If the vent should become defective from dryness or dirt, its efficiency can be restored by blowing water through the same, so that the slit is cleared. The vent may be driven or screwed into a small cork-hole of the bung or barrel, as deemed best, it forming a more convenient and effective device for supplying air than the more complicated patent faucets, or the stationary vents in the bungs, which are exposed to too rough usage in handling and transporting the kegs.

The action of the vent is perfectly reliable, as the air is forced through the slit by the opening of the faucet, while the slit is closed in perfectly air-tight manner, so as to withstand any pressure of the carbonic acid, whether light or strong, and preventing the escape of the same as soon as the faucet is closed, so that the beer or other liquid in the keg is kept nice and fresh for a long time.

Having thus described my invention, I claim as new and desire to secure by Letters Patent—

1. The combination of a receiving-tube, being open at one end, and having a bottom vent-tube, with a rubber tube fitted by a spiral supporting-spring, and a perforated knob into the receiving-tube, and provided with a bottom slit, substantially in the manner and for the purpose set forth.

2. The detachable rubber tube or plug of a barrel-vent, being supported by a spiral spring attached to a perforated closing knob, and provided with a short longitudinal slit, substantially as specified.

EDWARD RUDOLPH BEHLERS.

Witnesses:
   JACOB FRANK,
   PHILIP WEBER.